United States Patent
Le et al.

(10) Patent No.: US 11,106,970 B2
(45) Date of Patent: Aug. 31, 2021

(54) LOCALIZING TREE-BASED CONVOLUTIONAL NEURAL NETWORKS

(71) Applicant: International Business Machines Corporation, Armonk, NY (US)

(72) Inventors: Tung D. Le, Ichikawa (JP); Taro Sekiyama, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 15/815,771

(22) Filed: Nov. 17, 2017

(65) Prior Publication Data

US 2019/0156184 A1    May 23, 2019

(51) Int. Cl.
  *G06N 3/04*    (2006.01)
  *G06F 8/41*    (2018.01)
  *G06F 9/451*   (2018.01)

(52) U.S. Cl.
  CPC ........... *G06N 3/0481* (2013.01); *G06F 8/427* (2013.01); *G06F 9/454* (2018.02)

(58) Field of Classification Search
  CPC ...... G06N 3/0481; G06N 3/04; G06N 3/0454; G06N 5/003; G06F 9/455
  See application file for complete search history.

(56) References Cited

U.S. PATENT DOCUMENTS

2016/0328646 A1   11/2016  Lin et al.

FOREIGN PATENT DOCUMENTS

WO    2016141282 A1    9/2016

OTHER PUBLICATIONS

Ma, Mingbo, et al. "Dependency-based convolutional neural networks for sentence embedding." arXiv preprint arXiv:1507.01839 (2015). (Year: 2015).*

Mou, Lili, et al. "TBCNN: A tree-based convolutional neural network for programming language processing." arXiv preprint arXiv:1409.5718 (2014). (Year: 2014).*

Meng et al., "Context-Aware Tree-Based Convolutional Neural Networks for Natural Language Inference", KSEM 2016, LNAI 9983, pp. 515-526, 2016, DOI: 10.1007/978-3-319-47650-6 41, © Springer International Publishing AG 2016.

(Continued)

*Primary Examiner* — Kamran Afshar
*Assistant Examiner* — Jeremy Scott Cooper
(74) *Attorney, Agent, or Firm* — William H. Hartwell (57) ABSTRACT

In an approach to localizing tree-based convolutional neural networks, a method includes creating a first tree-based convolution layer (TBCL) corresponding to a tree, where the tree includes a first plurality of nodes and a node that has been indicated to be a first pivotal node. The first TBCL includes a second plurality of nodes and a second pivotal node having a feature vector based on node data from the first pivotal node. The method also includes creating a second TBCL corresponding to the tree. The second TBCL may include a third plurality of nodes. The method further includes determining a feature vector a third pivotal node in the third plurality of nodes based on the feature vectors from: (i) the second pivotal node, (ii) a parent node of the second pivotal node, and (iii) a child node of the second pivotal node.

20 Claims, 7 Drawing Sheets

(56) References Cited

OTHER PUBLICATIONS

Mou et al., "Convolutional Neural Networks over Tree Structures for Programming Language Processing", arXiv:1409.5718v2 [cs.LG] Dec. 8, 2015, 8 pages, Copyright © 2016, Association for the Advancement of Artificial Intelligence (www.aaai.org), All rights reserved.
Mou et al., "Discriminative Neural Sentence Modeling by Tree-Based Convolution", arXiv:1504.01106v5 [cs.CL] Jun. 2, 2015, 10 pages.

* cited by examiner

LOCALIZING TREE-BASED CONVOLUTIONAL NEURAL NETWORKS

BACKGROUND OF THE INVENTION

The present invention relates generally to the field of neural networks, and more particularly to tree-based convolutional neural networks including a designated pivotal node.

Deep neural networks have been traditionally used for natural language processing (NLP) applications. Deep neural networks have multiple layers where each layer of the neural network trains on a set of features based on the output of the previous layer. This hierarchical approach allows deep neural networks to model complex non-linear relationships. Deep neural networks include many different approaches depending on the type of data being trained. Some types of deep neural networks include recurrent neural networks (RNNs) and convolutional deep neural networks (CNNs), among others.

SUMMARY

Embodiments of the present invention disclose a method, a computer program product, and a system for localizing tree-based convolutional neural networks. The method may include one or more processors creating a first tree-based convolution layer (TBCL) corresponding to a tree. The tree may include a first plurality of nodes and a node that has been indicated to be a first pivotal node. The first TBCL may include a second plurality of nodes and wherein the first TBCL includes a second pivotal node having a feature vector based on node data from the first pivotal node. The method may further include one or more processors creating a second TBCL corresponding to the tree. The second TBCL may include a third plurality of nodes. The method may further include one or more processors determining a feature vector for the third pivotal node in the third plurality of nodes using the feature vectors from: (i) the second pivotal node, (ii) a parent node of the second pivotal node, and (iii) a child node of the second pivotal node.

DETAILED DESCRIPTION

Tree-based convolutional neural networks (TBCNN) are a novel approach to deep neural networks. Tree-based analysis in TBCNNs is achieved by creating one or more tree-based convolutional (TBC) layers including a tree where each node includes a feature vector based on an input tree. Each node is transformed to a node in the next TBC layer with features of the node and its descendants as well as weight and bias parameters. The last TBC layer is connected to a conventional neural network (e.g., a fully connected layer) by extracting feature vectors via a dynamic pooling.

TBCNNs allow efficient analysis of tree data structures using deep neural networks. Analysis of tree data structures is useful in natural language processing and other applications. For example, TBCNNs allow deep neural networks to analyze computer programs represented as abstract syntax trees (ASTs). TBCNNs have also shown promise in other areas where tree-based analysis is necessary. However, a shortcoming of TBCNN is that it is difficult to analyze subtrees and it is not possible to specify nodes to extract feature vectors. Additionally, it is unclear whether extracting maximum values among all nodes is always good for subtree analysis. These problems are more acute when trees with high number of nodes are given.

The present invention analyzes subtrees in a TBCNN by determining a pivotal node and gathering feature vectors from all nodes connected to the pivotal node. Feature vectors are gathered from all nodes connected to the pivotal node. Implementation of embodiments of the present invention may take a variety of forms, and exemplary implementation details are discussed subsequently with reference to the Figures.

Figure 1:
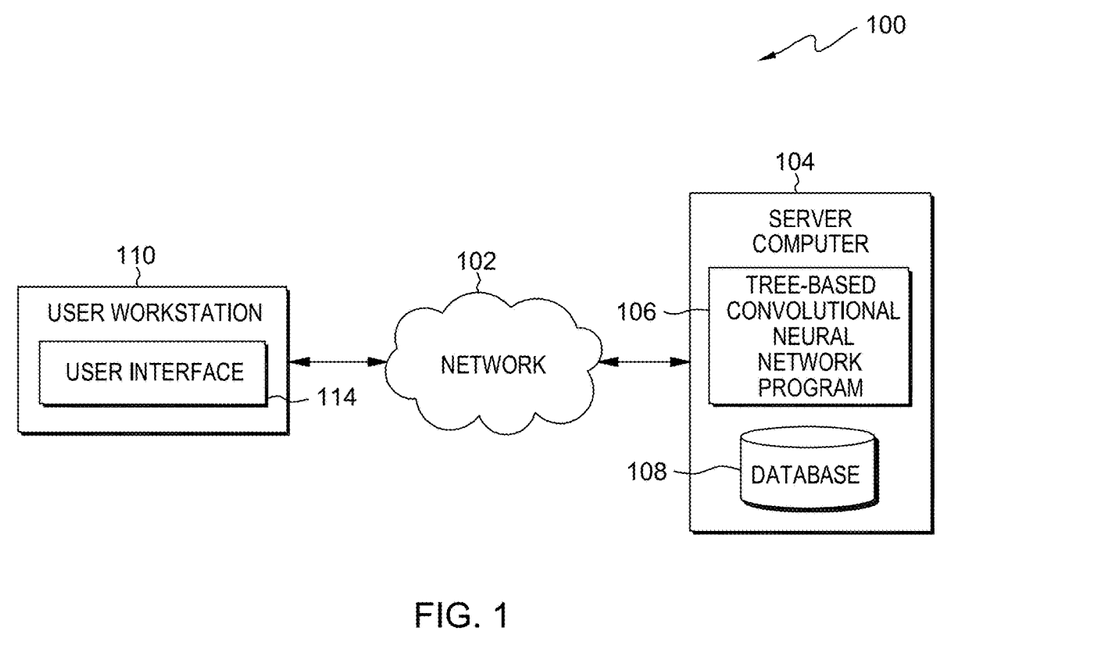
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and user workstation 110, all interconnected over network 102.

In general, network 102 can be any combination of connections and protocols that will support communications between server computer 104 and user workstation 110, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content service, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with user workstation 110, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 8.

Server computer 104 includes TBCNN program 106 for analyzing subtrees in a TBCNN. TBCNN program 106 receives a tree comprising a plurality of nodes. TBCNN program 106 determines the feature vectors of each node in the tree. TBCNN program 106 further determines the feature vectors of the pivotal node based on the feature vectors of its ancestor nodes.

TBCNN program 106 is described by one or more deep learning layers. TBCNN program 106 receives an input tree. The input tree includes a pivotal node. In some embodiments of the present invention, the pivotal node is the root node of a subtree under analysis by TBCNN program 106.

TBCNN program 106 determines a first TBC layer by extracting a feature vector for each node in the input tree. TBCNN program 106 further determines a first TBC layer by extracting feature vectors for each node in the input tree based on the corresponding node and its descendants. TBCNN program 106 additionally determines a second TBC layer by extracting feature vectors based on the pivotal node. TBCNN program 106 also includes a dynamic pool which extracts value from feature vectors of the previous layer. In this context, a dynamic pool refers to a layer of a deep neural network that computes a fixed-size representation from a variable-sized input. Finally, TBCNN program 106 connects the output of the dynamic pooling to a conventional neural network (e.g., a neural network with fully connected layers).

Database 108 is a repository for data used by TBCNN program 106. Data used by TBCNN program 106 may include one or more trees including a plurality of nodes and a pivotal node. In the depicted embodiment, database 108 resides on server computer 104. In another embodiment, database 108 may reside elsewhere within distributed data processing environment 100 provided TBCNN program 106 has access to database 108.

User workstation 110 enables a user to access TBCNN program 106 to submit one or more trees for analysis. In some embodiments of the present invention, user workstation 110 is a device that performs programmable instructions. For example, user workstation 110 can be a laptop computer, a tablet computer, a smart phone, or any programmable electronic mobile device capable of communicating with various components and devices within distributed data processing environment 100, via network 102. In general, user workstation 110 represents any programmable electronic mobile device or combination of programmable electronic mobile devices capable of executing machine readable program instructions and communicating with other computing devices (not shown) within distributed data processing environment 100 via a network, such as network 102. User workstation 110 includes an instance of user interface 114.

User interface 114 provides an interface to TBCNN program 106 on server computer 104 for a user of user workstation 110. In some embodiments of the present invention, user interface 114 may be a graphical user interface (GUI) or a web user interface (WUI) and can display text, documents, web browser windows, user options, application interfaces, instructions for operation, and include the information (such as graphic, text, and sound) that a program presents to a user and the control sequences the user employs to control the program. In other embodiments, user interface 114 may also be mobile application software that provides an interface between a user of user workstation 110 and server computer 104. Mobile application software, or an "app," is a computer program designed to run on smart phones, tablet computers and other mobile devices. In other embodiments, user interface 114 may be an external device operatively connected to user workstation 110 via near-field communication or other types of wired and/or wireless technologies.

Figure 2:
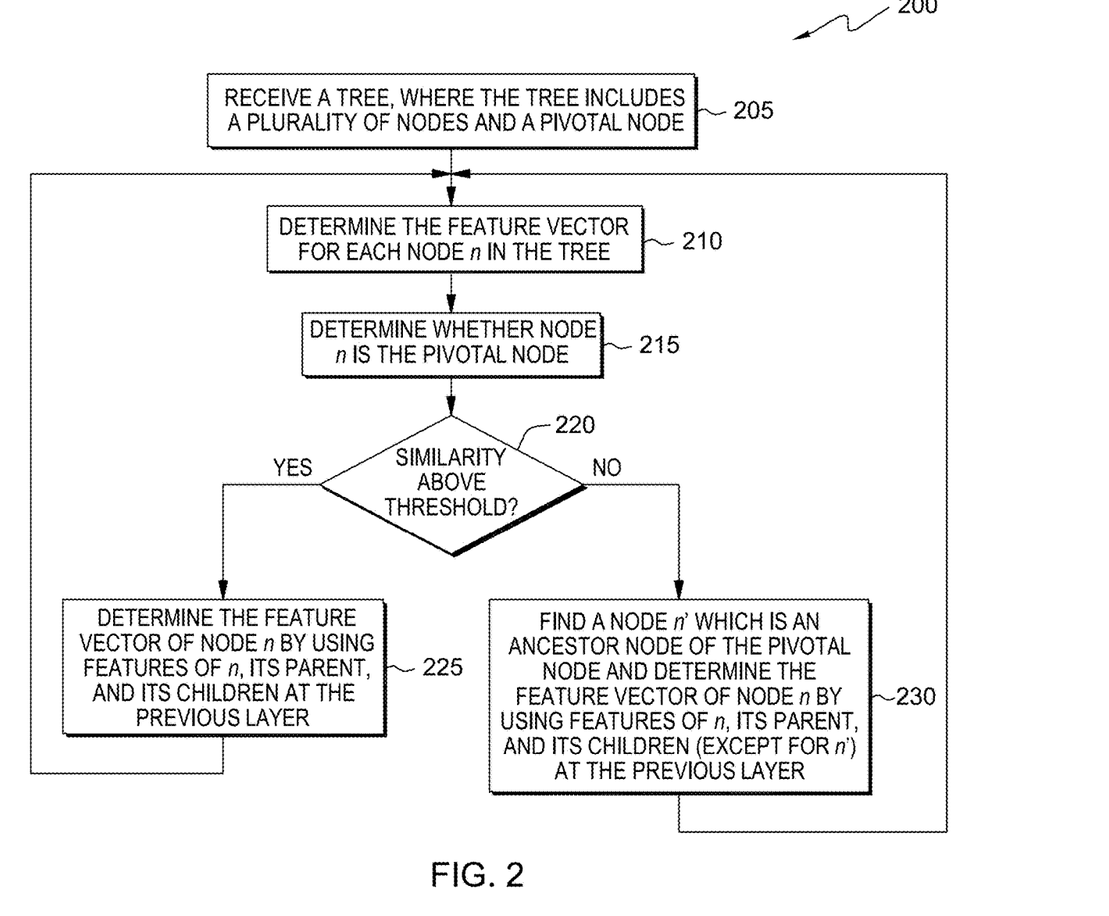
FIG. 2 is a flowchart depicting operational steps of a TBCNN program for analyzing subtrees in a TBCNN, in accordance with an embodiment of the present invention.

TBCNN program 106 is depicted and described in further detail with respect to FIG. 2. Referring to flowchart 200, TBCNN program 106 receives a tree including a plurality of nodes and a pivotal node. TBCNN program 106 determines the feature vectors of each node in the tree. TBCNN program 106 further determines the feature vectors of the pivotal node based on the feature vectors of its ancestor nodes.

Processing begins at operation 205, where TBCNN program 106 receives an input tree, where the input tree includes a plurality of nodes and a pivotal node. In some embodiments of the present invention, TBCNN program 106 provides a platform where one or more users can log in to submit the tree and identify the pivotal node. In some embodiments, TBCNN program 106 provides an application programming interface (API) to submit the tree and identify the pivotal node. In some embodiments, TBCNN program 106 receives a natural tree representation of a computer program in the form of an abstract syntax tree (AST), where each node in the AST represents an abstract component in a program source code. In some embodiments, TBCNN program 106 determines an initial feature vector for each node in the tree. In some embodiments, the initial feature vector may be an arbitrary value. In other embodiments, the initial feature vector may be a one-hot vector (e.g., a 1×N matrix used to distinguish each node from any other node in the tree). In some embodiments, these initial feature vectors capture the underlying meaning of the discrete symbols of the AST nodes.

Figure 3:
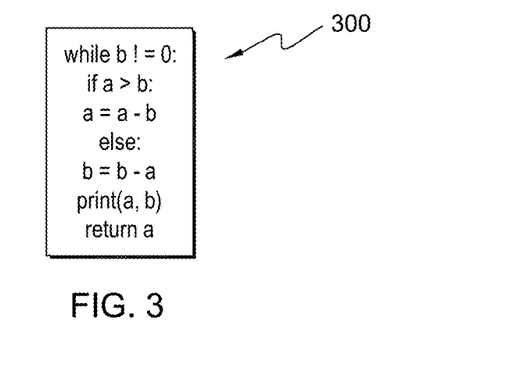
FIG. 3 is an illustration depicting a computer program, in accordance with an embodiment of the present invention.
Figure 4:
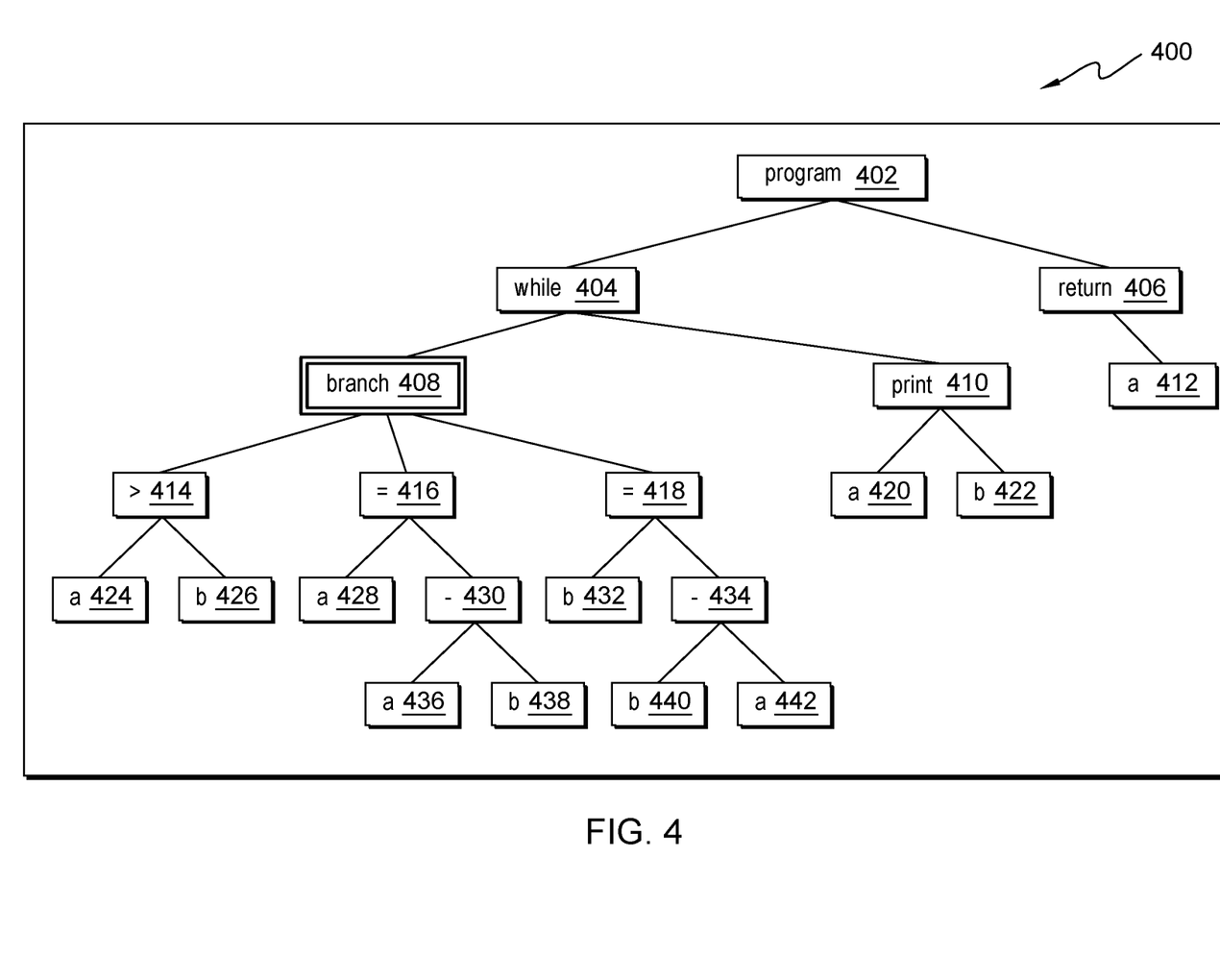
FIG. 4 is a block diagram depicting an abstract syntax tree, in accordance with an embodiment of the present invention.

In an exemplary embodiment of this invention, a user named Ben utilizes user workstation 110 to log in to TBCNN program 106 to submit computer program 300 (shown in FIG. 3) for analysis. TBCNN program 106 converts computer program 300 into AST 400 (shown in FIG. 4), including nodes 402 to 442 and pivotal node 408. In this example, AST 400 represents an input tree corresponding to computer program 300. In an additional exemplary embodiment, a user named Lisa utilizes workstation 110 to log in to TBCNN program 106 to submit an input tree 702 (shown in FIG. 7).

Processing continues at operation 210, where TBCNN program 106 determines the initial feature vector for each node n in the tree. In some embodiments of the present invention, TBCNN program 106 determines a first TBC layer by embedding the node information from each node in the input tree.

Figure 5:
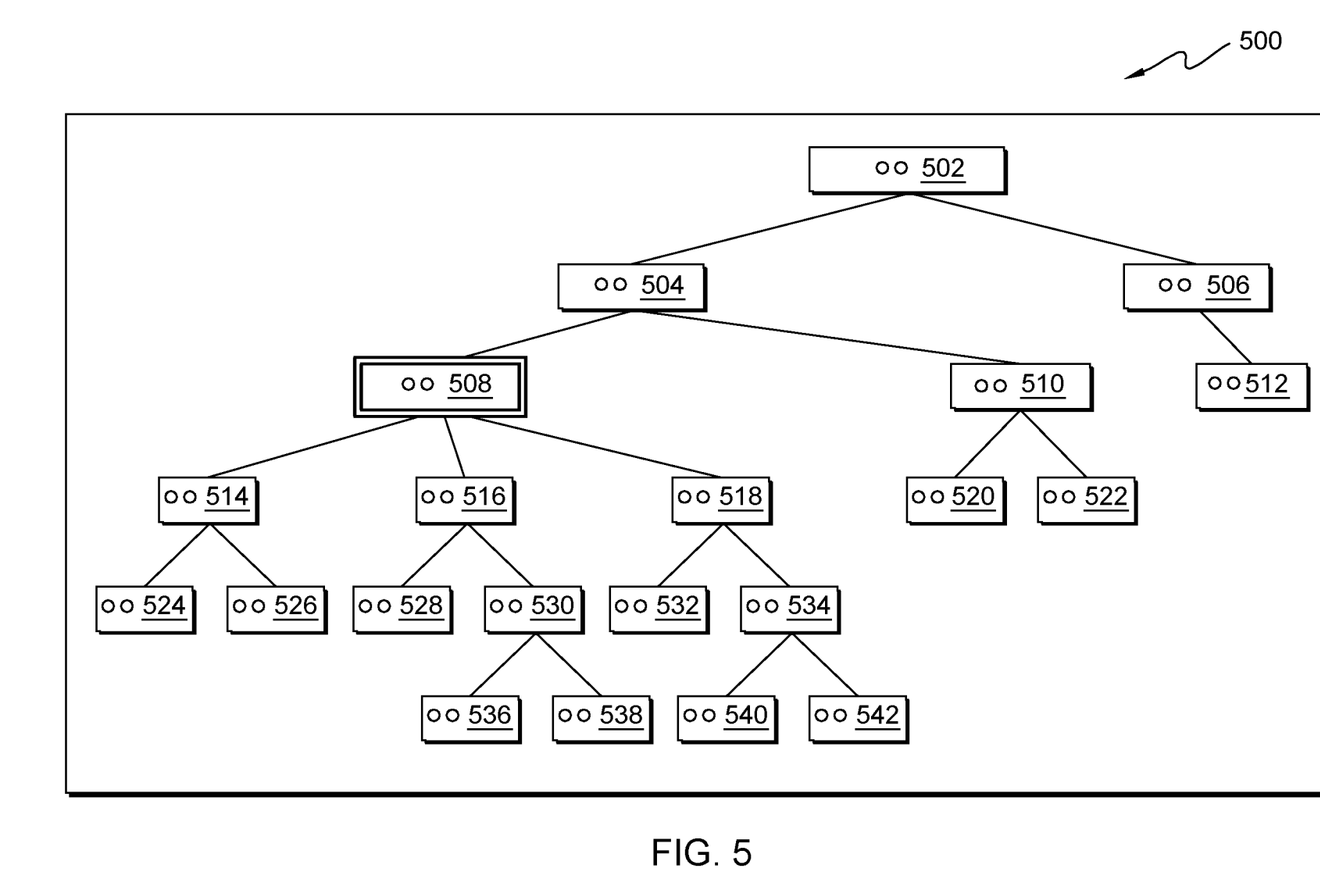
FIG. 5 is a block diagram depicting feature vectors of the abstract syntax tree, in accordance with an embodiment of the present invention.

Continuing the exemplary embodiment, as shown in FIG. 5, each node of tree 500 determines an initial feature vector representation of node 402 through node 442 and embedding these feature vector representations in the corresponding node 502 through node 542. In this exemplary embodiment, tree 500 represents the first TBC layer.

Continuing the additional exemplary embodiment, TBCNN program 106 determines a first TBC layer 704 (shown in FIG. 7) by embedding the feature vectors of nodes in input tree 702 in a corresponding node in tree 704.

Processing proceeds to operation 215, where TBCNN program 106 determines whether each node n is the pivotal node. In some embodiments of the present invention, TBCNN program 106 evaluates each node n in the first TBC layer to determine if node n is the pivotal node. If the current node is the pivotal node (operation 220, "yes" branch), processing continues at operation 225, where TBCNN program 106 determines the feature vector of node n by using features of n, its parent, and its children at the previous layer. In some embodiments of the present invention, each node is transformed to a node in the next TBC layer with features of a set of respective nodes of the pivotal node including: the pivotal node itself, its parent, and its children. In some embodiments, the feature vectors of the respective nodes may be multiplied by parameters such as weight and bias parameters. In some embodiments, the feature vector of node n is determined by the respective feature vectors multiplied by a weight factor plus a bias factor (e.g., feature vector of n=feature vector of respective nodes of node n*weights+biases). In some embodiments of the present invention, the feature vectors of children are calculated in bottom-up fashion. In some embodiments, if node n is in the last TBC layer, features extracted from nodes near node n are connected to the next neural network.

Figure 6:
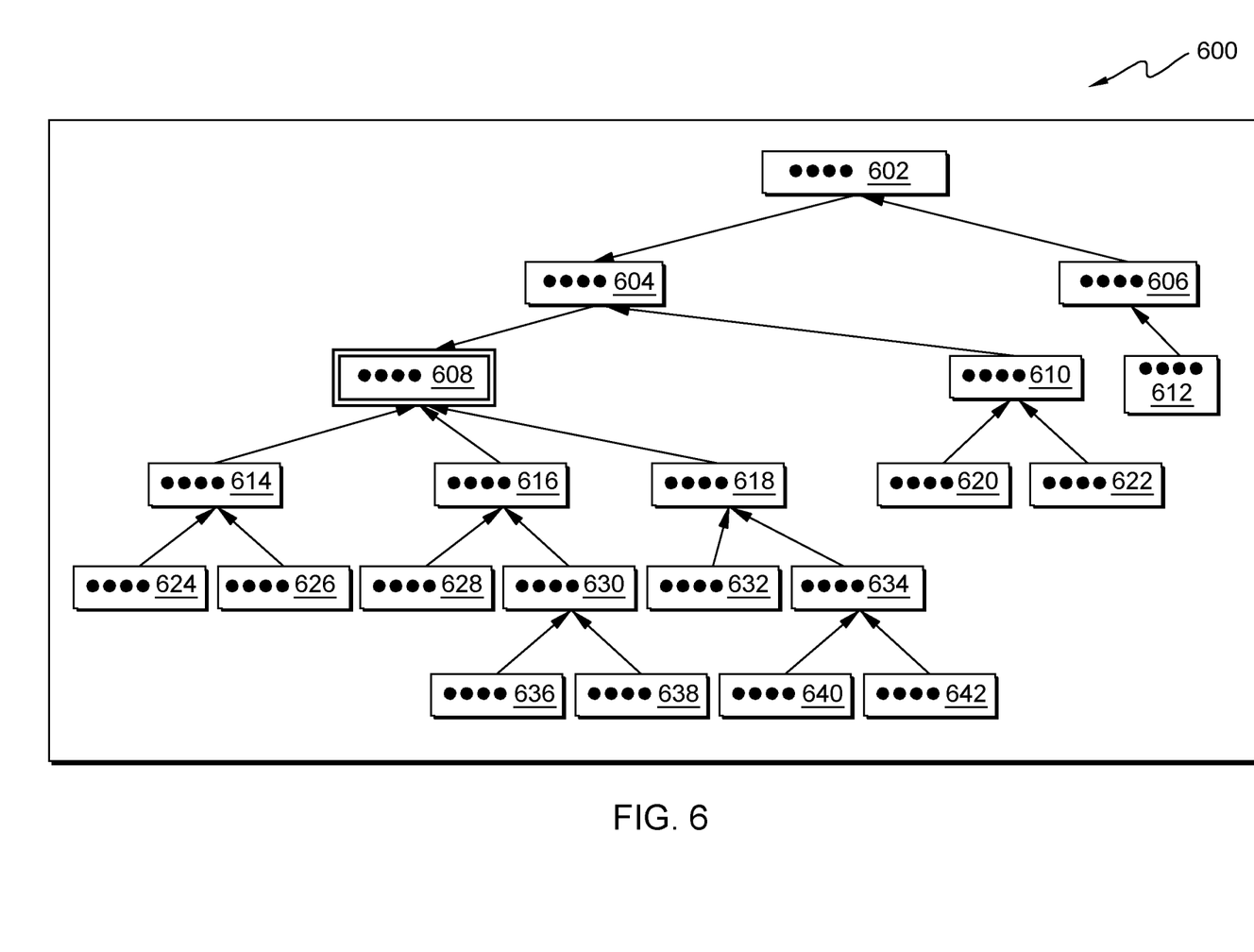
FIG. 6 is a block diagram depicting extraction of feature vectors of the abstract syntax tree to a pivotal node, in accordance with an embodiment of the present invention.

In the exemplary embodiment, TBCNN program 106 determines the feature vector of pivotal node 608 based on the feature vectors of the children nodes of pivotal node 608 (e.g., nodes 614, 616, 618, and their respective children nodes) and the feature vectors of 608 and its parent node 604 at the previous layer (shown in FIG. 5).

If the current node is not the pivotal node (operation 220, "no" branch), processing continues at operation 230, where TBCNN program 106 finds a node n' which is an ancestor node of the pivotal node and determine the feature vector of node n by using feature vectors of node n, its parent, and its children (except for node n') at the previous layer. In some embodiments, of the present invention, each node is transformed to a node in the next TBC layer with features of a set of respective nodes including: the node itself, its parent, and its children (except at least a node n' which is an ancestor of the pivotal node). The feature vectors of the respective nodes may be multiplied by parameters such as weight and bias parameters. In some embodiments, the feature vector of node n is determined by the respective feature vectors multiplied by a weight factor plus a bias factor (e.g., feature vector of n=feature vector of respective nodes of node n*weights+biases). In some embodiments of the present invention, the feature vectors of children are calculated in bottom-up fashion. In some embodiments, if node n is in the last TBC layer, features extracted from nodes near node n are connected to the next neural network.

Continuing the exemplary embodiment, as shown in FIG. 6, TBCNN program 106 determines the feature vectors of tree 600. The directional arrows shown in tree 600 correspond to the data dependency between nodes in order to determine the feature vectors of tree 600. For example, the feature vectors of nodes 502, 510, and 504, multiplied by a weight factor plus a bias code, determine the feature vector of node 604, and the feature vectors of nodes 506 and 502, multiplied by a weight factor plus a bias code, determine the feature vector of node 602. The feature vector of node 614 is determined by the feature vector of node 524 and node 526, multiplied by a weight factor plus a bias code.

Figure 7:
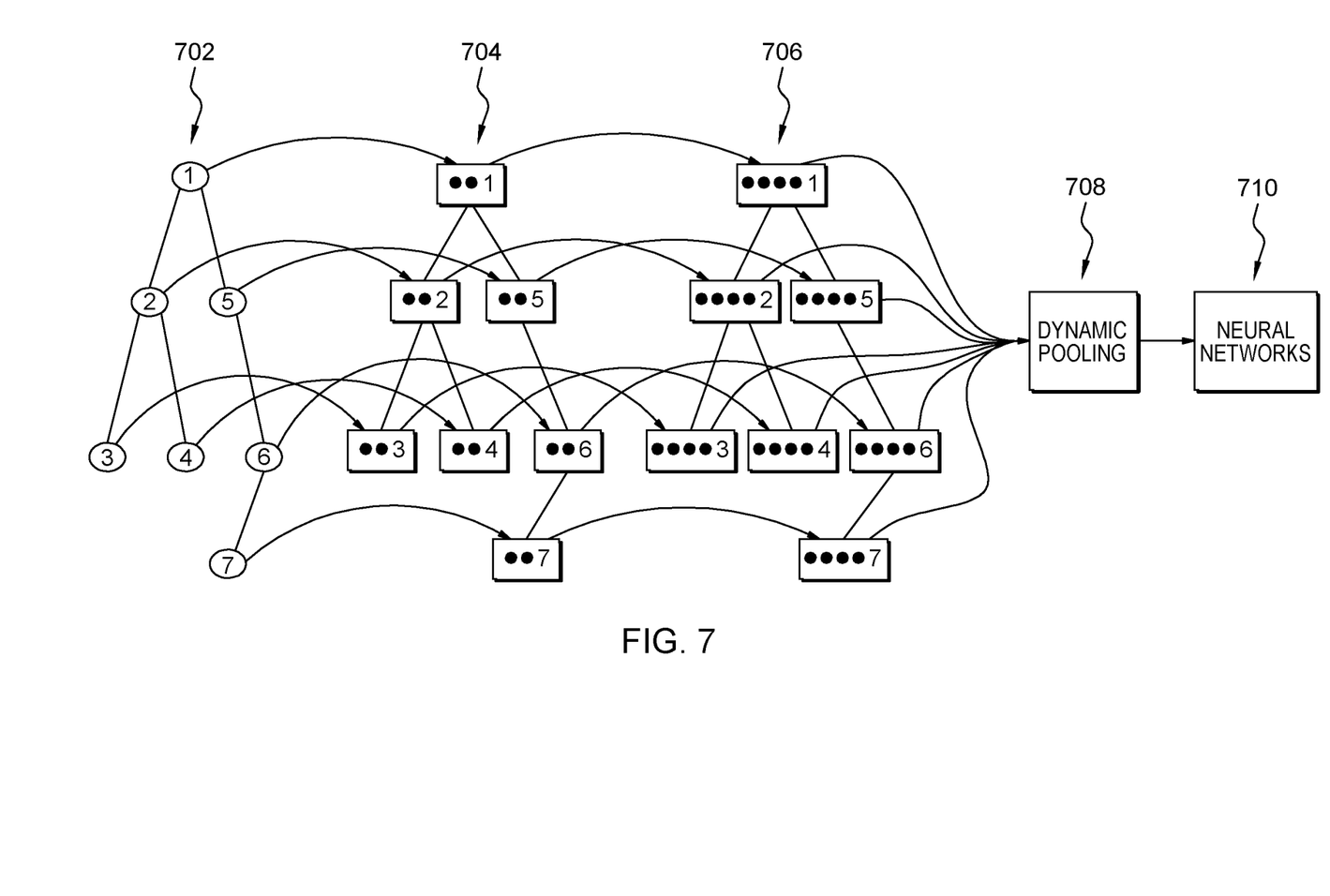
FIG. 7 is an illustration depicting one or more layers of a tree-based convolutional neural network.

Each node in the resulting tree 600 includes feature vectors determined in accordance with these embodiments. The nodes near the pivotal node 608 in tree 600 are connected to a conventional neural network (e.g., a fully connected layer) by extracting feature vectors via a dynamic pooling. For example, the feature vectors connected to a conventional neural network typically are obtained from the pivotal node itself. As shown in the additional exemplary embodiment, TBCNN program 106 determines a second TBC layer 704 by embedding the feature vectors of nodes in tree 704 in a corresponding node in tree 706 in accordance with operation 210 through operation 230. Tree 706 may be connected to a conventional neural network 710 via a dynamic pooling 708.

Figure 8:
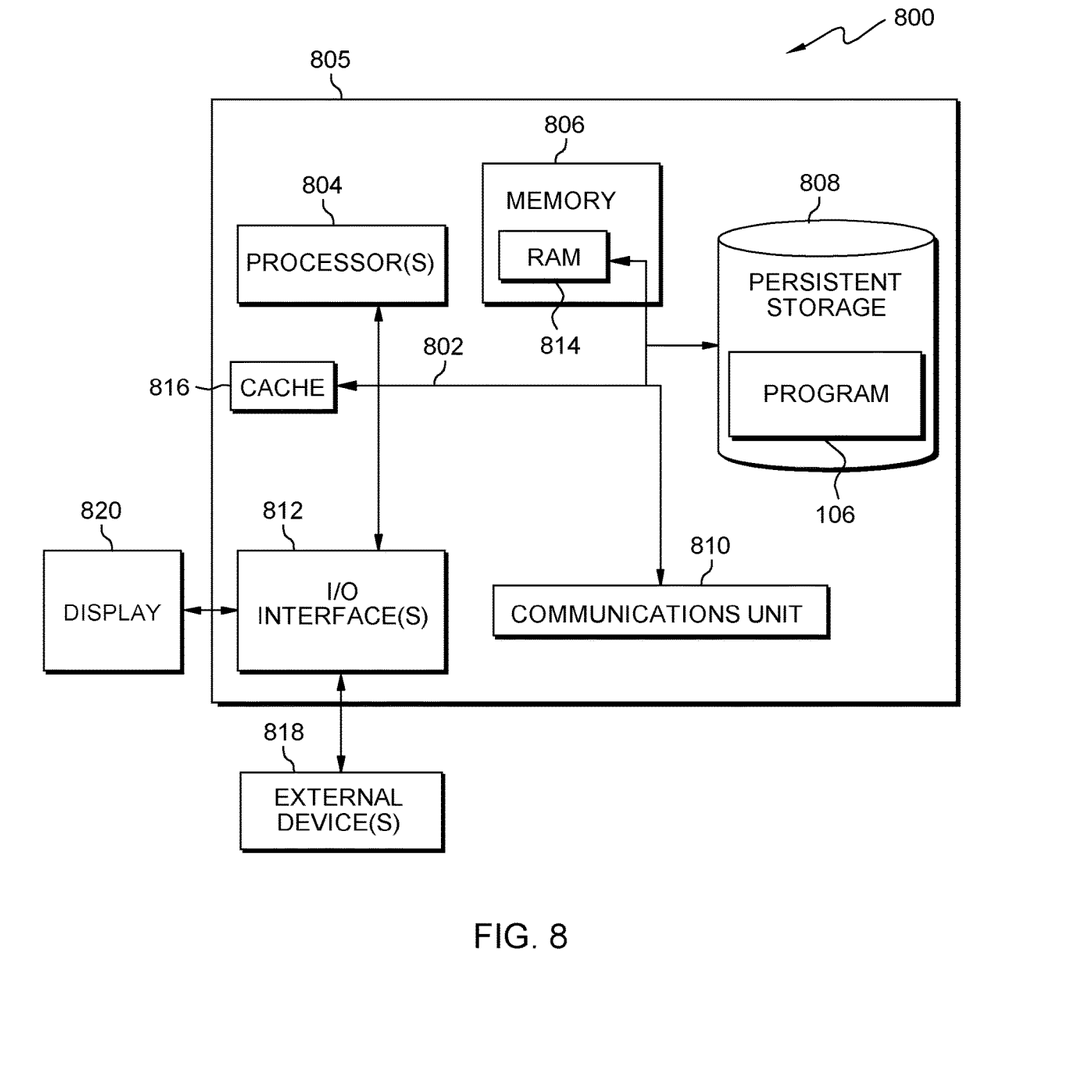
FIG. 8 depicts a block diagram of components of the server computer executing the user identification program within the distributed data processing environment of FIG. 1, in accordance with an embodiment of the present invention.

FIG. 8 depicts a block diagram 800 of components of server computer 104 within distributed data processing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 805 and server computer 104 include communications fabric 802, which provides communications between computer processor(s) 804, memory 806, persistent storage 808, communications unit 810, and input/output (I/O) interface(s) 812.

Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

TBCNN program 106 is stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of distributed data processing environment 100. In these examples, communications unit 810 includes one or more network interface cards. Communications unit 810 may provide communications through the use of either or both physical and wireless communications links. TBCNN program 106 may be downloaded to persistent storage 808 through communications unit 810.

I/O interface(s) 812 allows for input and output of data with other devices that may be accessible to computing device 805 and server computer 104, such as user workstation 110, and other computing devices (not shown). For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., TBCNN program 106 can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, a tree and an identification of a subtree within the tree to be analyzed, wherein the tree includes a first plurality of nodes, and wherein the subtree includes a first pivotal node different from a root node of the tree;
   creating, by one or more processors, a first tree-based convolution layer (TBCL) corresponding to the tree, wherein the first TBCL includes a second plurality of nodes, and wherein the first TBCL includes a second pivotal node having a feature vector based on node data from the first pivotal node;
   creating, by one or more processors, a second TBCL corresponding to the tree, wherein the second TBCL includes a third plurality of nodes;
   determining, by one or more processors, a feature vector of a third pivotal node in the third plurality of nodes based on: (i) the feature vector from the second pivotal node, (ii) a feature vector from a parent node of the second pivotal node, and (iii) a feature vector from a child node of the second pivotal node; and
   analyzing, by one or more processors, the subtree utilizing the determined feature vector of the third pivotal node.

2. The computer-implemented method of claim 1, further comprising, for each respective node of the second plurality of nodes that is not the second pivotal node, determining, by one or more processors, a feature vector for a corresponding node in the third plurality of nodes based on feature vectors from: (i) the respective node, (ii) a parent node of the respective node, and (iii) one or more child nodes of the respective node that are not ancestors of the second pivotal node.

3. The computer-implemented method of claim 2, wherein determining the feature vector for a corresponding node in the third plurality of nodes includes utilizing a weight parameter and a bias parameter.

4. The computer-implemented method of claim 1, wherein each node of the second plurality of nodes includes a respective feature vector determined by node data from a respective one or more nodes in the first plurality of nodes.

5. The computer-implemented method of claim 4, further comprising determining the respective feature vector for each node of the second plurality of nodes utilizing a weight parameter and a bias parameter.

6. The computer-implemented method of claim 1, further comprising connecting, by one or more processors, the second TBCL to a conventional neural network by extracting feature vectors of the third plurality of nodes via a dynamic pooling.

7. The computer-implemented method of claim 1, wherein the tree indicates dependency relationships between nodes of the first plurality of nodes.

8. The computer-implemented method of claim 1, wherein the tree indicates constituency relationships between nodes of the first plurality of nodes.

9. The computer-implemented method of claim 1, wherein the tree represents an abstract syntax tree.

10. A computer program product, comprising:
    one or more computer readable storage media and program instructions stored on the one or more computer readable storage media, the stored program instructions comprising:
    program instructions to receive a tree and an identification of a subtree within the tree to be analyzed, wherein the tree includes a first plurality of nodes, and wherein the subtree includes a first pivotal node different from a root node of the tree;
    program instructions to create a first tree-based convolution layer (TBCL) corresponding to the tree, wherein the first TBCL includes a second plurality of nodes, and wherein the first TBCL includes a second pivotal node having a feature vector based on node data from the first pivotal node;
    program instructions to create a second TBCL corresponding to the tree, wherein the second TBCL includes a third plurality of nodes;
    program instructions to determine a feature vector of a third pivotal node in the third plurality of nodes based on: (i) the feature vector from the second pivotal node, (ii) a feature vector from a parent node of the second pivotal node, and (iii) a feature vector from a child node of the second pivotal node; and
    program instructions to analyze the subtree utilizing the determined feature vector of the third pivotal node.

11. The computer program product of claim 10, the stored program instructions further comprising program instructions to, for each respective node of the second plurality of nodes that is not the second pivotal node, determine a feature vector for a corresponding node in the third plurality of nodes based on feature vectors from: (i) the respective node, (ii) a parent node of the respective node, and (iii) one or more child nodes of the respective node that are not ancestors of the second pivotal node.

12. The computer program product of claim 10, wherein each node of the second plurality of nodes includes a respective feature vector determined by node data from a respective one or more nodes in the first plurality of nodes.

13. The computer program product of claim 10, the stored program instructions further comprising program instructions to connect the second TBCL to a conventional neural network by extracting feature vectors of the third plurality of nodes via a dynamic pooling.

14. The computer program product of claim 10, wherein the tree indicates dependency relationships between nodes of the first plurality of nodes.

15. The computer program product of claim 10, wherein the tree indicates constituency relationships between nodes of the first plurality of nodes.

16. A computer system, comprising:
one or more computer processors;
one or more computer readable storage media;
program instructions stored on the one or more computer readable storage devices media for execution by at least one of the one or more computer processors, the stored program instructions comprising:
program instructions to receive a tree and an identification of a subtree within the tree to be analyzed, wherein the tree includes a first plurality of nodes, and wherein the subtree includes a first pivotal node different from a root node of the tree;
program instructions to create a first tree-based convolution layer (TBCL) corresponding to the tree, wherein the first TBCL includes a second plurality of nodes, and wherein the first TBCL includes a second pivotal node having a feature vector based on node data from the first pivotal node;
program instructions to create a second TBCL corresponding to the tree, wherein the second TBCL includes a third plurality of nodes;
program instructions to determine a feature vector of a third pivotal node in the third plurality of nodes based on: (i) the feature vector from the second pivotal node, (ii) a feature vector from a parent node of the second pivotal node, and (iii) a feature vector from a child node of the second pivotal node; and
program instructions to analyze the subtree utilizing the determined feature vector of the third pivotal node.

17. The system of claim 16, the stored program instructions further comprising program instructions to, for each respective node of the second plurality of nodes that is not the second pivotal node, determine a feature vector for a corresponding node in the third plurality of nodes based on feature vectors from: (i) the respective node, (ii) a parent node of the respective node, and (iii) one or more child nodes of the respective node that are not ancestors of the second pivotal node.

18. The system of claim 16, wherein each node of the second plurality of nodes includes a respective feature vector determined by node data from a respective one or more nodes in the first plurality of nodes.

19. The system of claim 16, wherein the tree indicates dependency relationships between nodes of the first plurality of nodes.

20. The system of claim 16, wherein the tree indicates constituency relationships between nodes of the first plurality of nodes.

* * * * *